(12) United States Patent
Sakai

(10) Patent No.: US 8,688,846 B2
(45) Date of Patent: Apr. 1, 2014

(54) METHOD OF FINDING A COMMUNICATIONS PARAMETER PROVIDER IN A WIRELESS NETWORK

(75) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 494 days.

(21) Appl. No.: 12/599,973

(22) PCT Filed: Jul. 4, 2008

(86) PCT No.: PCT/JP2008/062531
§ 371 (c)(1),
(2), (4) Date: Nov. 12, 2009

(87) PCT Pub. No.: WO2009/014014
PCT Pub. Date: Jan. 29, 2009

(65) Prior Publication Data
US 2010/0228868 A1    Sep. 9, 2010

(30) Foreign Application Priority Data

Jul. 20, 2007    (JP) .................................. 2007-189449

(51) Int. Cl.
*G06F 15/16*    (2006.01)
(52) U.S. Cl.
USPC .......................... 709/228; 709/227; 455/432.1
(58) Field of Classification Search
USPC .................................. 709/227–229; 370/431
See application file for complete search history.

(56) References Cited

U.S. PATENT DOCUMENTS

| 2004/0253969 | A1* | 12/2004 | Nguyen et al. | 455/515 |
| 2006/0239236 | A1* | 10/2006 | Otsuka | 370/338 |
| 2006/0246941 | A1 | 11/2006 | Watanabe et al. | 455/552.1 |
| 2007/0073914 | A1* | 3/2007 | Yoshida | 710/10 |

FOREIGN PATENT DOCUMENTS

| JP | 2003-338821 | 11/2003 |
| JP | 2006-303924 | 11/2006 |
| JP | 2007-81730 | 3/2007 |

OTHER PUBLICATIONS

U.S. Appl. No. 12/666,277, filed Dec. 22, 2009, Inventor: Tatsuhiko Sakai.

* cited by examiner

*Primary Examiner* — Mohamed Ibrahim
(74) *Attorney, Agent, or Firm* — Fitzpatrick, Cella, Harper & Scinto

(57) ABSTRACT

In order to make it possible for a communication apparatus to readily detect a provider of communication parameters, the provider of communication parameters specifies a network in which a receiver apparatus that requests receipt of communication parameter is participating, joins this network and then provides the communication parameters. The receiver apparatus creates a network for which a network identifier that is unique in the vicinity has been set and receives communication parameters from the provider.

13 Claims, 6 Drawing Sheets

METHOD OF FINDING A COMMUNICATIONS PARAMETER PROVIDER IN A WIRELESS NETWORK

TECHNICAL FIELD

The present invention relates to a communication apparatus and a communication method therefor.

BACKGROUND ART

In wireless communication represented by a wireless LAN complying with the IEEE802.11 standard series, there are many setting items to be set in advance. The setting items include communication parameters necessary for wireless communication, such as an SSID (Service Set IDentifier) as a network identifier, an encryption method, an encryption key, an authentication method, and an authentication key. It is very troublesome for a user to set them by manual input.

Various manufacturers have proposed automatic setting methods for easily setting communication parameters in a wireless apparatus. In those automatic setting methods, one apparatus provides another apparatus with communication parameters using a procedure predetermined between these connected apparatuses and a message, thereby automatically setting the communication parameters.

As for the communication parameter automatic setting method, each manufacturer often employs its proprietary method. Procedures for setting communication parameters or interpretable messages are different between apparatuses which do not support a common communication parameter automatic setting method. In this case, it is impossible to set communication parameters using the automatic setting method. On the other hand, between apparatuses which support a common communication parameter automatic setting method, it is possible to easily set communication parameters using the automatic setting method.

Japanese Patent Laid-Open No. 2003-338821 has disclosed an example of communication parameter automatic setting.

A communication parameter automatic setting method requires a role of "provider" which provides another wireless apparatus with communication parameters and a role of "acceptor" which receives the communication parameters provided by the provider and sets them in the acceptor itself. Therefore, when a wireless apparatus needs to receive communication parameters by automatic setting, it must search for a provider that can provide those communication parameters.

However, since the provider does not necessarily respond to a signal for searching for a provider, it is impossible to easily search for a provider of the communication parameters.

In an ad-hoc network (IBES: Independent Basic Service Set) complying with the IEEE802.11 standard, a station which has transmitted a beacon last returns a response to a probe request as a search request signal. This means even if a given apparatus transmits a probe request to search for a provider, an apparatus other than the provider may respond. It is therefore difficult to find a provider of the communication parameters.

DISCLOSURE OF INVENTION

It is an object of the present invention to easily and quickly find a provider which provides communication parameters.

According to one aspect of the present invention, a communication apparatus comprises: a detection means which detects a receiver apparatus which requests receipt of communication parameters; a joining means which joins the ad-hoc network in which the receiver apparatus is participating; and a providing means which, via the ad-hoc network joined by the joining means, provides the receiver apparatus with communication parameters for joining an ad-hoc network.

According to another aspect of the present invention, a communication apparatus comprises: a generating means which generates a network identifier that is unique among networks in the vicinity; a creating means which creates a network for which the network identifier generated by the generating means has been set; a transmitting means which transmits a search signal for searching for a provider apparatus of communication parameters; and a receiving means which receives communication parameters from the provider apparatus, which has joined the network created by the creating means.

According to still another aspect of the present invention, a communication method of a communication apparatus, the method comprises a step, in a case where a receiver apparatus that requests receipt of communication parameters is detected, of joining the ad-hoc network in which the receiver apparatus is participating and providing the receiver apparatus with communication parameters for joining an ad-hoc network.

According to yet another aspect of the present invention, a communication method of a communication apparatus, the method comprises steps of creating a network for which a network identifier that is unique among networks in the vicinity has been set, and receiving communication parameters from a communication-parameter provider apparatus that has joined the network.

According to the present invention, it is possible to easily and quickly find a provider which provides communication parameters. Further, the provision of communication parameters can be performed with ease even in the case of a network on which it is difficult to specify a provider.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

<First Embodiment>

A wireless communication apparatus according to the present invention will be described in detail below with reference to the accompanying drawings. Although a case in which a wireless LAN system complying with the IEEE802.11 standard series is used will be explained blow, a communication method is not necessarily limited to a wireless LAN.

A hardware configuration in the preferred embodiment will be described.

Figure 1:
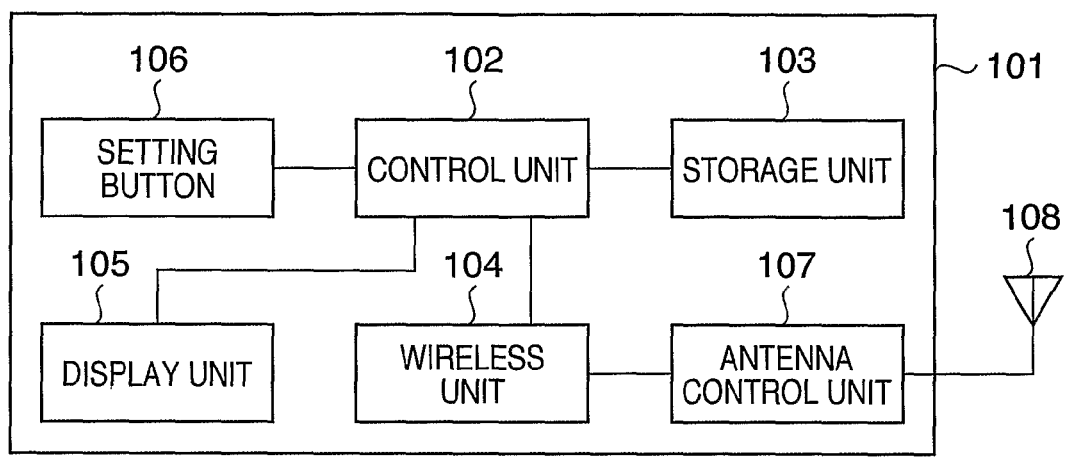
FIG. 1 is a block diagram illustrating the configuration of a terminal.

FIG. 1 is a block diagram showing a configuration of each terminal (to be described later) according to embodiments to which the present invention is applicable. Reference numeral 101 denotes a terminal as a whole; and 102, a control unit which controls the terminal as a whole by executing control programs stored in a storage unit 103. The control unit 102 also controls communication parameter setting with another terminal. The storage unit 103 stores the control programs executed by the control unit 102 and various pieces of information such as communication parameters. Various operations (to be described later) are performed when the control unit 102 executes the control programs stored in the storage unit 103. Reference numeral 104 denotes a wireless unit for wireless communication; 105, a display unit which provides various displays and has a function capable of outputting visually perceivable information like an LCD (Liquid Crystal Display) or LED (Light Emitting Diode), or a function capable of outputting a sound like a loudspeaker; and 106, a setting button which triggers a start of the communication parameter setting. The control unit 102 starts a communication parameter setting operation (to be described later) by detecting a user operation of the setting button 106. Reference numeral 107 denotes an antenna control unit; and 108, an antenna.

Figure 2:
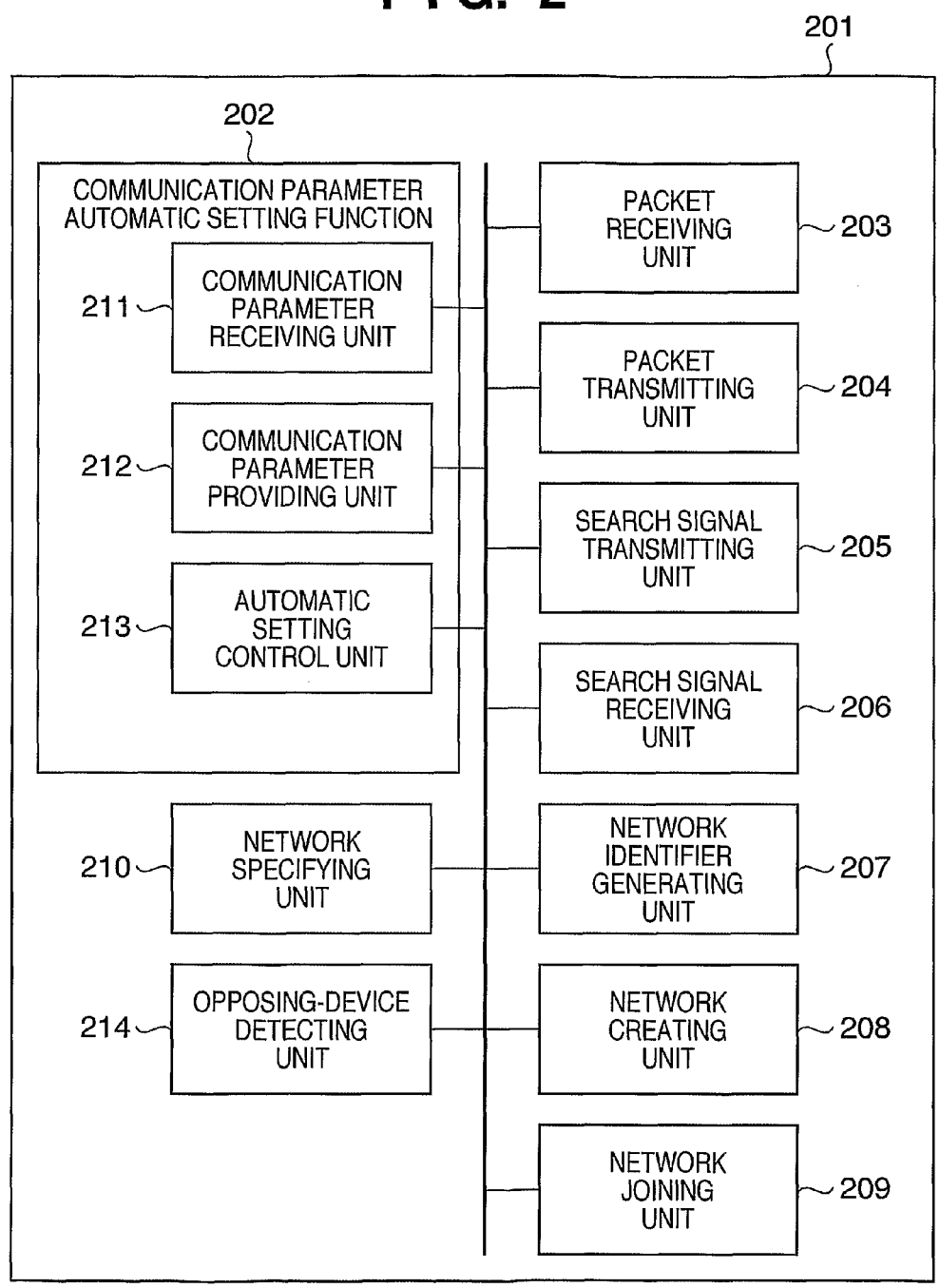
FIG. 2 is a block diagram of software functions within a terminal according to an embodiment of the present invention.

FIG. 2 is a block diagram showing a configuration of software functional blocks executed by each terminal (to be described later) according to this embodiment.

Reference numeral 201 denotes a terminal as a whole; and 202, a communication parameter automatic setting function. In this embodiment, communication parameters necessary for wireless communication, such as an SSID as a network identifier, an encryption method, an encryption key, an authentication method, and an authentication key are automatically set. Reference numeral 203 denotes a packet receiving unit which receives packets associated with various communications; 204, a packet transmitting unit which transmits packets associated with various communications; and 205, a search signal transmitting unit which controls transmission of apparatus search signals such as a Probe_Request signal. It should be noted that a Probe_Request signal can also be referred to as a network search signal for searching for a desired network. Transmission of a Probe_Request signal, described later, is performed by the search signal transmitting unit 205. Reference numeral 206 denotes a search signal receiving unit which controls reception of apparatus search signals such as a Probe_Request signal from another terminal. The search signal receiving unit 206 executes reception processing of a Probe_Response signal (to be described later). The Probe_Response signal is a response signal to the Probe_Request signal, and various pieces of information (self-information) on an apparatus that transmitted the Probe_Response signal are added to the Probe_Response signal.

A network identifier generating unit 207 generates a network identifier. Generation of the network identifier, described later, is performed by the network identifier generating unit 207. A network creating unit 208 creates a network. Creation of a network, described later, is performed by the network creating unit 208. A network joining unit 209 joins in a network. Joining in a network, described later, is performed by the network joining unit 209. In processing for automatically setting communication parameters, a network specifying unit 210 specifies a network in which an opposing terminal is joining. Specification of a network, described later, is performed by the network specifying unit 210. An opposing-device detecting unit 214 detects the existence of an opposing terminal in processing for automatically setting communication parameters.

The automatic setting function 202 that automatically sets communication parameters includes a communication parameter receiving unit 211 for receiving communication parameters sent from a provider of communication parameters; a communication parameter providing unit 212 for providing communication parameters to a device of another party in a case where the apparatus functions as a provider of communication parameters; and an automatic setting control unit 213 for controlling various protocols in automatic setting of communication parameters. Processing for automatically setting communication parameters, described later, is executed by the communication parameter receiving unit 211 and communication parameter providing unit 212 based upon control by the automatic setting control unit 213.

It should be noted that all of the function blocks are interrelated in terms of software or hardware. Further, the above-mentioned function blocks are examples, and it may be so arranged that a plurality of function blocks construct a single function block, and any function block may be broken down further into blocks that perform a plurality of functions.

Figure 3:
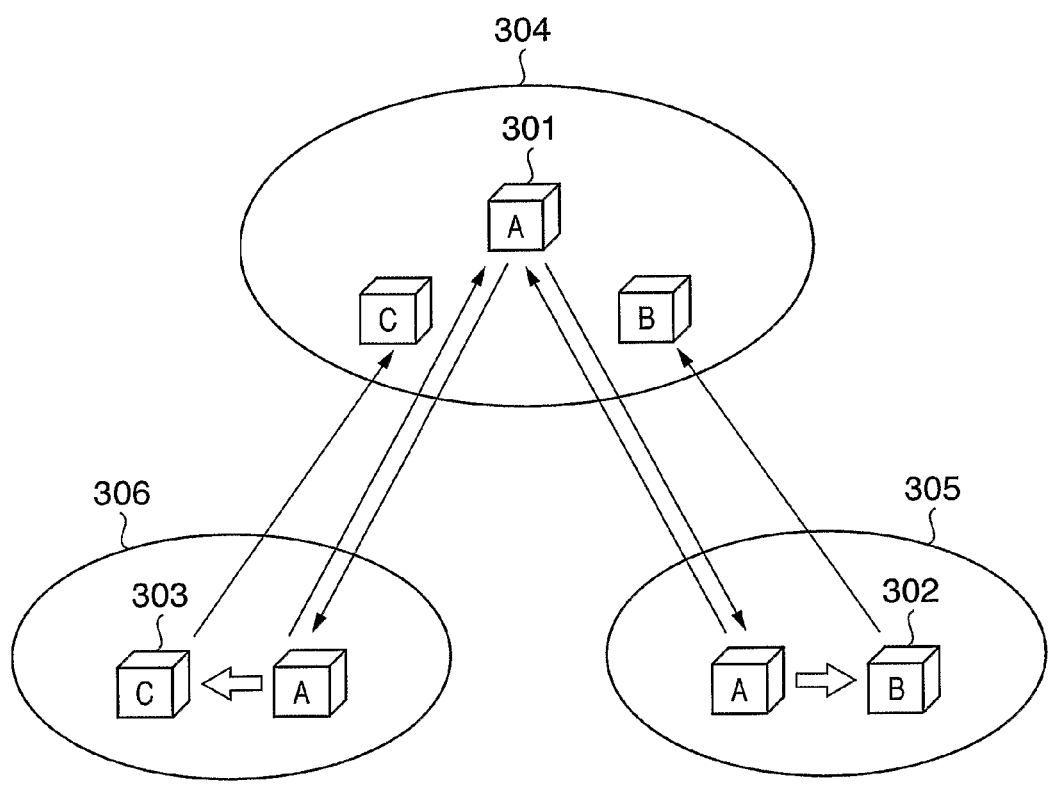
FIG. 3 is a configuration diagram in a case where an ad-hoc network is formed by three terminals in an embodiment.

FIG. 3 is a diagram illustrating a terminal 301 ("terminal A" below), a terminal 302 ("terminal B" below), a terminal 303 ("terminal C" below) and a shared network 304 constructed by the terminals A, B and C. Also illustrated in FIG. 3 are a first network 305 constructed by the terminals A and B, and a second network 306 constructed by the terminals A and C.

Each terminal is equipped with a wireless LAN communication function compliant with IEEE 802.11, performs wireless communication by wireless LAN ad-hoc communication ("ad-hoc communication" below) and is configured as illustrated in FIGS. 1 and 2 described earlier.

Considered in FIG. 3 is a situation in which the shared network 304 has been set up by terminal A and is joined by terminals B and C by the automatic setting of communication parameters.

Terminal A is the provider of communication parameters and provides terminals B and C with communication parameters needed in order to join the shared network 304. In this case terminals B and C are the receivers of communication parameters.

Figure 4:
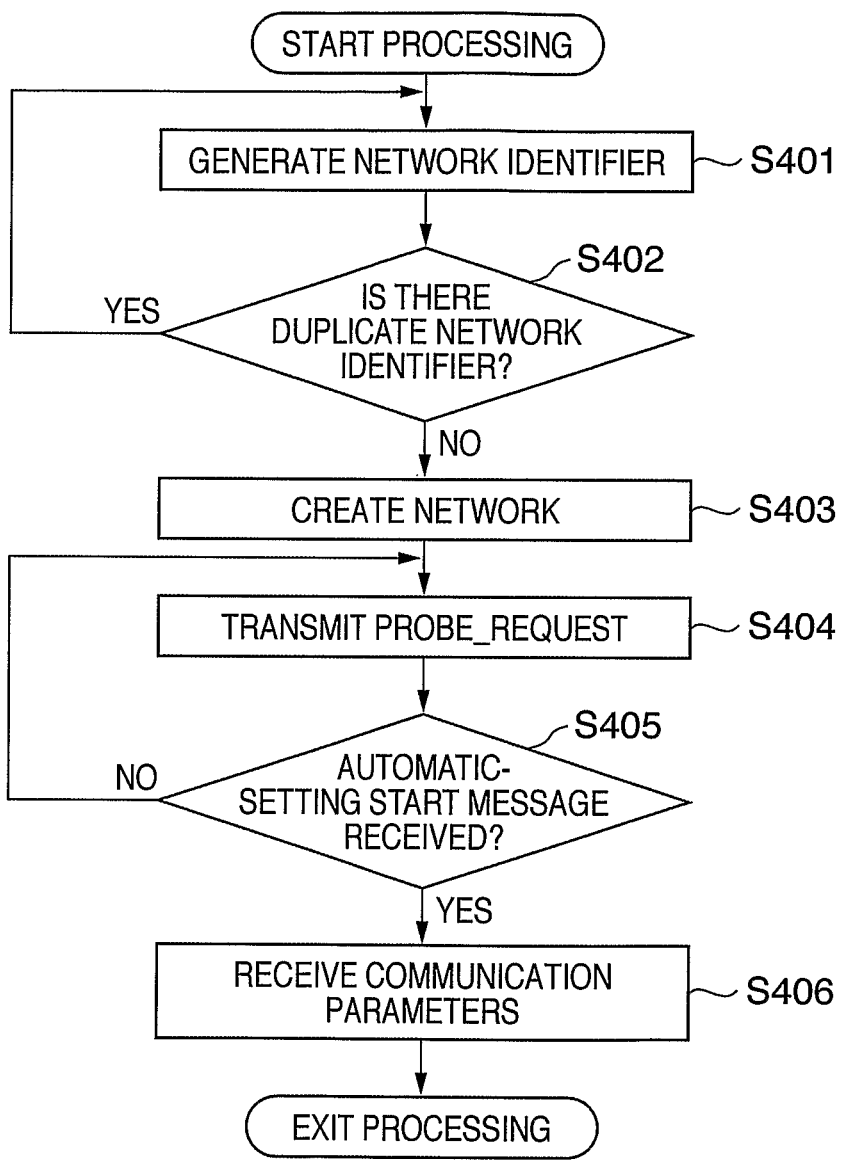
FIG. 4 is a flowchart illustrating operation of a communication-parameter receiver in an embodiment.

FIG. 4 is an operation flowchart for describing processing executed when a receiver of communication parameters receives communication parameters from a provider of communication parameters by processing for automatic setting of communication parameters. In the description that follows, the receiver of communication parameters shall be referred to as a "receiver", and the provider of communication parameters shall be referred to as a "provider". Further, the processing illustrated in FIG. 4 starts when a setting button at a terminal that is the receiver is operated by a user.

After processing starts, the network identifier generating unit 207 of the receiver generates a network identifier inclusive of receiver-specific information such as the MAC address of a communication interface (S401). Owing to the inclusion of the receiver-specific information in the network identifier, the network identifier generating unit 207 generates a network identifier that is unique among network identifiers set for networks that exist in the vicinity. It should be noted that instead of utilizing receiver-specific information as the network identifier at step S401, the network identifier generating unit 207 may generate and use a random character string. A network identifier that is unique among network identifiers set for networks that exist in the vicinity may be generated similarly by methods other than these.

Next, using the search signal transmitting unit 205 and search signal receiving unit 206, the receiver makes sure that the generated network identifier is not a duplicate of an identifier of a network existing in the vicinity (S402). In other words, the receiver broadcasts a Probe_Request signal to the surroundings and determines whether a Probe_Response signal, which is a signal that is a response to the Probe_Request signal, is sent back. If a Probe_Response signal has been sent back, the receiver checks the content thereof to thereby make sure that the generated network identifier does not duplicate that of a network in the vicinity (S402).

If a network for which a duplicate network identifier has been set exists, control returns to step S401 and the receiver generates a network identifier again. If a network for which a duplicate network identifier has been set does not exist, then the network creating unit 208 of the receiver creates the network for which the network identifier has been generated (S403).

After the network is created, the search signal transmitting unit 205 of the receiver transmits a Probe_Request signal that carries additional information signifying the automatic setting of communication parameters (S404).

The opposing-device detecting unit 214 of the receiver then waits for the provider to transmit a message indicative of start of automatic setting of communication parameters (S405). If the start message is not received even upon elapse of a fixed period of time, the search signal transmitting unit 205 repeats the transmission of the Probe_Request signal.

If the opposing-device detecting unit 214 of the receiver receives the start message, then the communication parameter receiving unit 211 of the receiver receives the communication parameters provided by the provider (S406).

Figure 5:
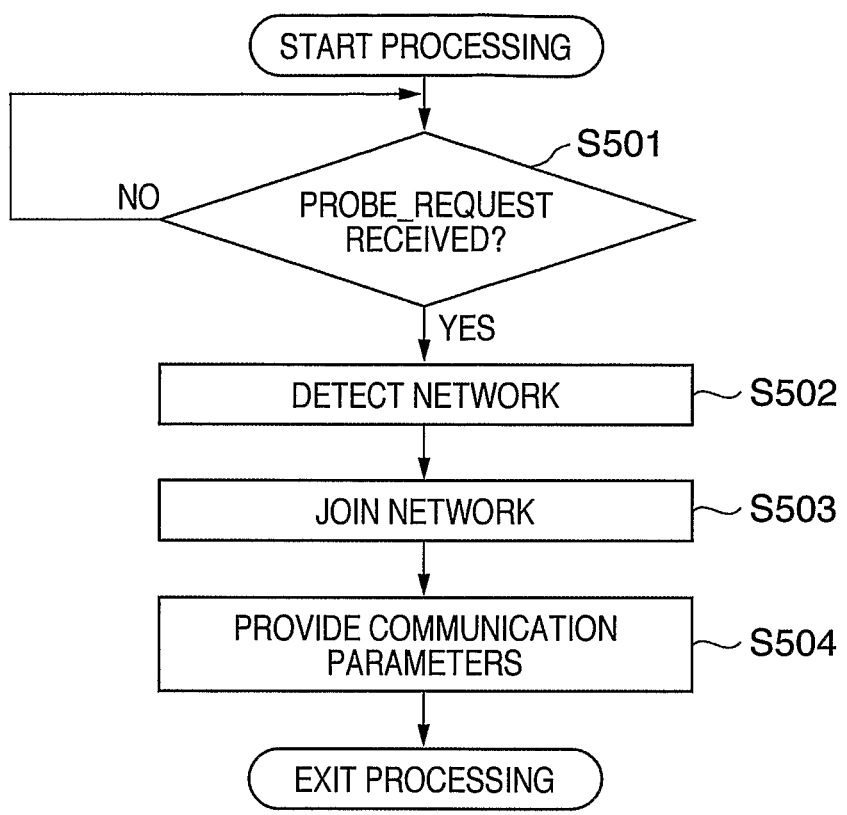
FIG. 5 is a flowchart illustrating operation of a communication-parameter provider in an embodiment.

FIG. 5 is an operation flowchart for describing processing executed when a provider provides communication parameters to a receiver by processing for automatic setting of communication parameters. The processing illustrated in FIG. 5 starts when a setting button at a terminal that is the provider is operated by a user.

After processing starts, the opposing-device detecting unit 214 of the provider waits for the receiver to transmit a Probe_Request signal that carries additional information signifying automatic setting of communication parameters (S501). Processing is exited if the Probe_Request signal is not received even upon elapse of a fixed period of time from the start of automatic setting processing.

If the Probe_Request signal is received, the provider uses the search signal transmitting unit 205 and search signal receiving unit 206 to detect the network on which the terminal that transmitted the Probe_Request signal exists and to specify the network identifier of this network (S502). In network detection, the Probe_Request signal is broadcast by the search signal transmitting unit 205 and a Probe_Response signal to the Probe_Request signal is received by the search signal receiving unit 206. By analyzing the content of the received Probe_Response signal, the provider acquires information concerning networks in the vicinity. The provider compares a transmit-source MAC address of the Probe_Response signal sent back from a terminal in the vicinity with the transmit-source MAC address of the Probe_Request signal received at S501.

If the result of the comparison is that the transmit-source MAC addresses of the two messages match, the provider refers to the network information contained in the Probe_Response signal to thereby specify the network identifier of the network in which the receiver is joining.

After the network identifier is specified, the network joining unit 209 of the provider joins the network in which the receiver is joining (S503).

After the network is joined, the communication parameter providing unit 212 of the provider transmits a message indicative of start of automatic setting of communication parameters and provides communication parameters to the receiver (S504).

Figure 6:
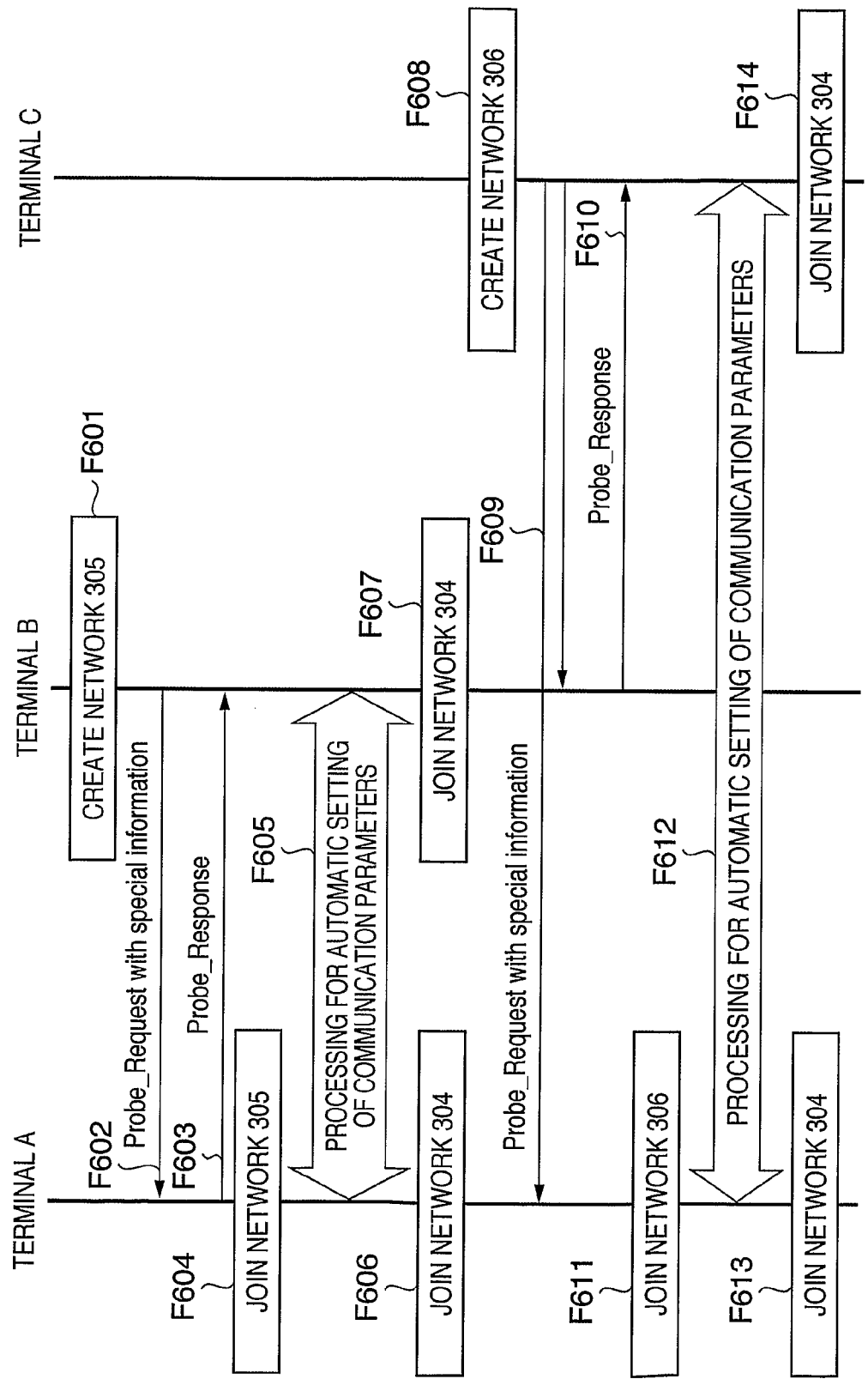
FIG. 6 is a sequence diagram illustrating operation of terminals A, B and C in an embodiment.

FIG. 6 is a sequence diagram regarding processing by which terminals B and C receive the communication parameters of the shared network 304 from terminal A and join the shared network 304.

When processing is started, terminal B creates the network 305 for which a network identifier that is unique at least among network identifiers of networks that exist in the vicinity has been set (F601).

Terminal B transmits a Probe_Request signal to which has been appended an identifier indicating that it has a function for automatic setting of communication parameters (F602).

Upon receiving the Probe_Request signal transmitted at F602, terminal A sends a Probe_Response signal back to terminal B (F603).

Upon receiving the Probe_Request signal, which has been transmitted from terminal B, to which has been appended the identifier indicating possession of the function for automatic setting of communication parameters, terminal A detects and specifies the network 305 that has been created by terminal B and joins this network (F604).

On the network 305, terminal A provides the communication parameters of the shared network 304 by automatic setting of the communication parameters (F605).

After the automatic setting of communication parameters is completed, terminal A joins (returns to) the shared network 304 (F606).

Similarly, after the automatic setting of communication parameters is completed, terminal B joins the shared network 304 using the communication parameters received (F607).

When processing for automatic setting of communication parameters is started, terminal C creates the network 306 for which a network identifier that is unique at least among network identifiers of networks that exist in the vicinity has been set (F608).

Terminal C transmits a Probe_Request signal to which has been appended an identifier indicating that it has a function for automatic setting of communication parameters (F609).

In an ad-hoc network compliant with IEEE 802.11, it is stipulated that the terminal that transmits a beacon last sends back the Probe_Response signal in response to a Probe_Request signal, as mentioned earlier.

Accordingly, in a case where terminal B is joining in the shared network 304 in addition to terminal A which is the provider, there are instances where terminal B sends back a response depending upon timing (F610).

It should be noted that the Probe_Request signal is a signal that is broadcast to the surroundings. Therefore, even in a case where terminal A does not send back a Probe_Response signal, it is possible to sense that a Probe_Request signal has been transmitted from terminal C.

Upon receiving the Probe_Request signal, which has been transmitted from terminal C, to which has been appended the identifier indicating possession of the function for automatic setting of communication parameters, terminal A detects and specifies the network 306 that has been created by terminal C and joins this network (F611).

On the network 306, terminal A provides the communication parameters of the network 304 by automatic setting of the communication parameters (F612).

After the communication parameters are provided, terminal A joins (returns to) the shared network 304 (F613).

After the communication parameters are received, terminal C joins the shared network 304 using the communication parameters received (F614).

Thus, a receiver that requests the automatic setting of communication parameters creates a network that is unique in the vicinity and broadcasts an automatic-setting request signal, thereby notifying a provider of the existence of the receiver. Upon detecting the existence of the receiver, the provider detects and specifies the network created by the receiver and joins this network. The provision of the communication parameters is performed over the network that has been created by the receiver. As a result of such an arrangement, even if a network is one on which it is difficult to specify a provider, the provision of communication parameters and the automatic setting of communication parameters can be carried out with ease. Further, the receiver is capable of determining the provider quickly and easily.

<Second Embodiment>

In the first embodiment, the network specifying unit 210 of the provider terminal acquires information concerning networks in the vicinity at S502, thereby specifying the network created by the receiver.

In a second embodiment, the receiver terminal appends a network identifier of a network which it itself has created to a Probe_Request signal and then transmits the Probe_Request signal at S404.

In this case, at step S502 the provider terminal receives the Probe_Request signal to which has been appended the network identifier of the network created by the receiver. By discriminating the network identifier contained in the Probe_Request signal received, the provider terminal can specify the network created by the receiver.

As a result, a network that has been created by a receiver can be specified without acquiring information concerning networks in the vicinity.

Although the preferred embodiments of the present invention have been described above, they are merely examples for explaining the present invention, and are not intended to limit the scope of the present invention. Various modifications can be made to the embodiments without departing from the spirit and scope of the present invention.

For example, in the above explanation of the embodiments, Probe_Request and Probe_Response signals are used. However, signals to be transmitted are not limited to them, and other signals playing the same roles may be used.

An IEEE802.11 wireless LAN has been explained as an example. The present invention may, however, be implemented in another wireless medium such as wireless USB, MBOA, Bluetooth®, UWB (Ultra Wide Band), or ZigBee. The present invention may also be implemented in a wired communication medium such as a wired LAN.

Note that MBOA is an abbreviation for Multi Band OFDM Alliance. UWB includes wireless USB, wireless 1394, and WINET.

Although a network identifier, encryption method, encryption key, authentication method, and authentication key are used as examples of communication parameters, another information may be used and also included in communication parameters.

In the present invention, a storage medium which stores software program codes for implementing the above-described functions may be supplied to a system or apparatus, and the computer (or the CPU or MPU) of the system or apparatus may read out and execute the program codes stored in the storage medium. In this case, the program codes read out from the storage medium implement the functions of the above-described embodiments, and the storage medium which stores the program codes constitutes the present invention.

The storage medium for supplying the program codes includes a flexible disk, hard disk, optical disk, magnetooptical disk, CD-ROM, CD-R, magnetic tape, nonvolatile memory card, ROM, and DVD.

The above-described functions are implemented when the computer executes the readout program codes. Also, the above-described functions may be implemented when an OS running on the computer performs some or all of actual processes on the basis of the instructions of the program codes. OS is an abbreviation for Operating System.

Furthermore, the above-described functions may be implemented when the program codes read out from the storage medium are written in the memory of a function expansion board inserted into the computer or the memory of a function expansion unit connected to the computer, and the CPU of the function expansion board or function expansion unit performs some or all of actual processes on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-189449, filed Jul. 20, 2007, which is hereby incorporated by reference herein in its entirety.

The invention claimed is:

1. A communication apparatus comprising:
a searching unit constructed to search for a network in case that the communication apparatus is a providing apparatus which provides communication parameters for performing a communication in a first network to a receiver apparatus;
a detecting unit constructed to detect a predetermined signal, which includes information indicating a function for setting of the communication parameters, in the search by the searching unit;
a discriminating unit constructed to discriminate a second network, in which the receiver apparatus exists, based on the predetermined signal;
a joining unit constructed to join in the second network; and
a providing unit constructed to, via the second network joined by the joining unit, provide the communication parameters for performing the communication in the first network to the receiver apparatus.

2. The apparatus according to claim 1, wherein the first network and the second network have different first and second network identifiers, respectively, and
wherein the first network and the second network are created based on the first and second network identifiers, respectively.

3. The apparatus according to claim 2, wherein it is determined whether the first network identifier is a duplicate of the second network identifier.

4. The apparatus according to claim 1, wherein the discriminating unit discriminates a network identifier of the second network in which the receiver apparatus is existing;

wherein the joining unit joins in the second network based on the discriminated network identifier.

5. The apparatus according to claim 1, further comprising:
a transmitting unit constructed to transmit a probe signal for searching for networks in the vicinity; and
a receiving unit constructed to receive a response signal that is a response to the probe signal transmitted by the transmitting unit;
wherein on the basis of information indicating source of transmission of the response signal received by the receiving unit and information indicating source of transmission of a probe signal sent from the receiver apparatus, the discriminating unit discriminates the second network.

6. The apparatus according to claim 1, wherein the joining unit joins in the second network based upon an identifier of a network contained in the probe signal broadcasted from the receiver apparatus.

7. The apparatus according to claim 1, wherein after provision of the communication parameters for performing the communication in the first network to the receiver apparatus is completed, the communication apparatus joins in the first network.

8. A communication method of a communication apparatus, the method comprising:
searching for a network in case that the communication apparatus is a providing apparatus which provides communication meters for performing a communication in a first network to a receiver apparatus;
detecting a predetermined signal, which includes information indicating a function for setting of the communication parameters, in the search in the searching step;
discriminating a second network, in which the receiver apparatus exists, based on the predetermined signal;
joining in the second network; and
providing, via the second joined network, the communication parameters for performing the communication in the first network to the receiver apparatus.

9. The communication method according to claim 8, wherein the first network and the second network have different first and second network identifiers, respectively, and wherein the first network and the second network are created based on the first and second network identifiers, respectively.

10. The communication method according to claim 9, wherein it is determined whether the first network identifier is a duplicate of the second network identifier.

11. A non-transitory computer-readable storage medium storing a computer program, the computer program causing a computer to function as:
a searching unit constructed to search for a network in case that a communication apparatus is a providing apparatus which provides communication parameters for performing a communication in a first network to a receiver apparatus;
a detecting unit constructed to detect a predetermined signal, which includes information indicating a function for setting of the communication parameters, in the search by the searching unit;
a discriminating unit constructed to discriminate a second network, in which the receiver apparatus exists, based on the predetermined signal;
a joining unit constructed to join in the second network; and
a providing unit constructed to, via the second network joined by the joining unit, provide the communication parameters for performing the communication in the first network to the receiver apparatus.

12. The non-transitory computer-readable storage medium according to claim 11, wherein the first network and the second network have different first and second network identifiers, respectively, and
wherein the first network and the second network are created based on the first and second network identifiers, respectively.

13. The non-transitory computer-readable storage medium according to claim 12, wherein it is determined whether the first network identifier is a duplicate of the second network identifier.

* * * * *